United States Patent
Hyun et al.

(10) Patent No.: US 9,876,644 B2
(45) Date of Patent: Jan. 23, 2018

(54) AUTHENTICATING DATA PACKET BASED ON HASH IMAGE OF THE DATA PACKET IN ERASURE CODING-BASED DATA TRANSMISSION

(71) Applicant: Samsung Electronics Co., Ltd., Suwon-si (KR)

(72) Inventors: Sang Won Hyun, Seoul (KR); Eun Ah Kim, Seoul (KR); Seog Chung Seo, Seoul (KR); Myeong Wuk Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 14/470,051

(22) Filed: Aug. 27, 2014

(65) Prior Publication Data
US 2015/0156023 A1    Jun. 4, 2015

(30) Foreign Application Priority Data

Nov. 29, 2013 (KR) .................. 10-2013-0147659

(51) Int. Cl.
*H04L 9/32* (2006.01)

(52) U.S. Cl.
CPC .......... *H04L 9/3247* (2013.01); *H04L 9/3236* (2013.01)

(58) Field of Classification Search
CPC ...................... H04L 9/3247; H04L 9/3236
USPC ................................. 713/168, 171
See application file for complete search history.

(56) References Cited

U.S. PATENT DOCUMENTS

| 7,783,600 | B1* | 8/2010 | Spertus | G06F 11/10 |
| | | | | 707/610 |
| 8,706,701 | B1* | 4/2014 | Stefanov | G06F 17/30197 |
| | | | | 707/687 |
| 9,081,989 | B2* | 7/2015 | Lie | G06F 9/45558 |
| | | | | 707/687 |
| 2010/0064166 | A1* | 3/2010 | Dubnicki | G06F 17/30067 |
| | | | | 714/4.1 |
| 2010/0100587 | A1* | 4/2010 | Teglovic | G06F 11/1464 |
| | | | | 709/203 |
| 2010/0158391 | A1* | 6/2010 | Cunningham | G06F 17/30047 |
| | | | | 382/209 |
| 2010/0223533 | A1* | 9/2010 | Stockhammer | H03M 13/373 |
| | | | | 714/776 |

(Continued)

FOREIGN PATENT DOCUMENTS

| JP | 2008-118623 A | 5/2008 |
| KR | 10-2008-0106187 A | 12/2008 |
| KR | 10-1176648 B1 | 8/2012 |

OTHER PUBLICATIONS

Pannetrat, Alain, et al., "Efficient Mulicast Packet Authentication." NDSS. 2003 (12 pages).

(Continued)

*Primary Examiner* — Haresh N Patel
(74) *Attorney, Agent, or Firm* — NSIP Law (57) ABSTRACT

Provided is a method of authenticating and verifying data packet transmission, and apparatuses for performing the same. The method and corresponding apparatus are configured to encode data packets through erasure coding. The method and corresponding apparatus are also configured to generate authentication packets for the encoded data packets based on hash images of the encoded data packets.

14 Claims, 8 Drawing Sheets

(56) References Cited

U.S. PATENT DOCUMENTS

| | | | |
|---|---|---|---|
| 2011/0057884 A1* | 3/2011 | Gormish | G06F 9/54 |
| | | | 345/173 |
| 2011/0238987 A1 | 9/2011 | Kherani et al. | |
| 2012/0060072 A1* | 3/2012 | Simitci | H03M 13/373 |
| | | | 714/756 |
| 2012/0151206 A1* | 6/2012 | Paris | H04L 63/08 |
| | | | 713/155 |
| 2013/0080861 A1 | 3/2013 | Vyetrenko et al. | |
| 2013/0117834 A1* | 5/2013 | Ishioka | H04L 63/0869 |
| | | | 726/7 |
| 2013/0136125 A1* | 5/2013 | Jain | H04L 47/38 |
| | | | 370/392 |
| 2013/0179489 A1* | 7/2013 | Daley | H04L 67/2828 |
| | | | 709/203 |
| 2013/0339818 A1* | 12/2013 | Baker | G06F 11/10 |
| | | | 714/763 |
| 2015/0026741 A1* | 1/2015 | Lamarca | H04N 21/6175 |
| | | | 725/109 |
| 2015/0324590 A1* | 11/2015 | Krten | G06F 21/14 |
| | | | 726/26 |

OTHER PUBLICATIONS

Park, Jung Min, et al., "Efficient multicast stream authentication using erasure codes." ACM 2001 (34 pages).

\* cited by examiner

AUTHENTICATING DATA PACKET BASED ON HASH IMAGE OF THE DATA PACKET IN ERASURE CODING-BASED DATA TRANSMISSION

CROSS-REFERENCE TO RELATED APPLICATION(S)

This application claims the benefit under 35 USC 119(a) of Korean Patent Application No. 10-2013-0147659, filed on Nov. 29, 2013, in the Korean Intellectual Property Office, the entire disclosure of which is incorporated herein by reference for all purposes.

BACKGROUND

1. Field

The following description relates to a method of authenticating and verifying data packet transmission, and apparatuses for performing the same.

2. Description of Related Art

In a data transmission environment, erasure coding applied to transmit data without loss. The erasure coding may include encoding and decoding.

Encoded data packets may be generated by encoding original data packets. In this case, a number of the encoded data packets may be greater than a number of the original data packets. To restore the original data packets through the decoding, a greater or equal number of packets received from among the encoded data packets than the number of the original data packets may be required. However, when at least one modulated packet is included in the received packets, the original data packets may not be restored through the decoding.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method to authenticate data packet transmission, the method includes encoding data packets through erasure coding; and generating authentication packets for the encoded data packets based on hash images of the encoded data packets.

The generating may include generating, based on parameters for transmission of the data packets, the authentication packets until the hash images related to the encoded data packets are incorporated into a single signature packet.

The generating may include generating the hash images of the encoded data packets, verifying whether the hash images are included in a single signature packet, and generating signature packets included in the authentication packets based on a result of the verifying.

In response to the verifying that the hash images of the encoded data packets are included in the single signature packet, the verifying may include encoding the single signature packet through the erasure coding and generating the encoded signature packets to be the signature packets.

In response to the verifying indicating that the hash images are excluded from the single signature packet, the verifying may include generating hash packets including the hash images of the encoded data packets, encoding the hash packets through the erasure coding, generating the encoded hash packets included in the authentication packets, and verifying whether the hash images of the encoded hash packets are included in the single signature packet and generating the signature packets based on a result of the verifying.

The parameters may include at least one of a packet loss rate, a current number of packets, information of a hash function applied to the hash images, and information on a size of a unit signature packet including the hash images.

The hash images related to the encoded data packets may include at least one of hash images of the encoded data packets and hash images of packets of the encoded data packets.

A size of the single signature packet may be identical to a size of a data packet.

In accordance with an embodiment, there is provided a data transmission apparatus, including an encoder configured to encode data packets through erasure coding; and an authentication unit configured to generate an authentication packet for the data packets based on hash images of the encoded data packets.

The authentication unit may include an authentication packet generation unit configured to verify whether the hash images are included in a single signature packet and generate at least one of hash packets included in the hash images and the single signature packet based on a result of the verifying, and a digital signature generation unit configured to generate a digital signature for each of the encoded signature packets based on the single signature packet.

The authentication unit may be configured to generate the authentication packet until the hash images related to the encoded data packets are incorporated into a single signature packet based on parameters to transmit the data packets.

The authentication packet generation unit may be configured to generate the single signature packet in response to the hash images related to the encoded data packets being included in the single signature packet.

The hash images related to the encoded data packets may include at least one of hash images of the encoded data packets and hash images of packets related to the encoded data packets.

The parameters may include at least one of a packet loss rate, a number of current packets, information of a hash function applied to the hash images, and information on a size of a unit signature packet including the hash images.

A size of the single signature packet may be identical to a size of a data packet.

In accordance with an embodiment, there is provided a method to verify data packet transmission, the method includes receiving authentication packets and verifying a signature packet included in the authentication packets; and decoding the verified signature packet and verifying data packets based on hash images included in the decoded signature packet.

The decoding may include verifying hash packets included in the authentication packets using the hash images included in the decoded signature packet, and decoding the verified hash packets and verifying the data packets based on hash images included in the decoded hash packets.

The method may also include requesting an external device to transmit the data packets.

The method may also decode decoding the verified data packets and generate decoded data packets.

The decoded data packets may be identical to the data packets received from external devices.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
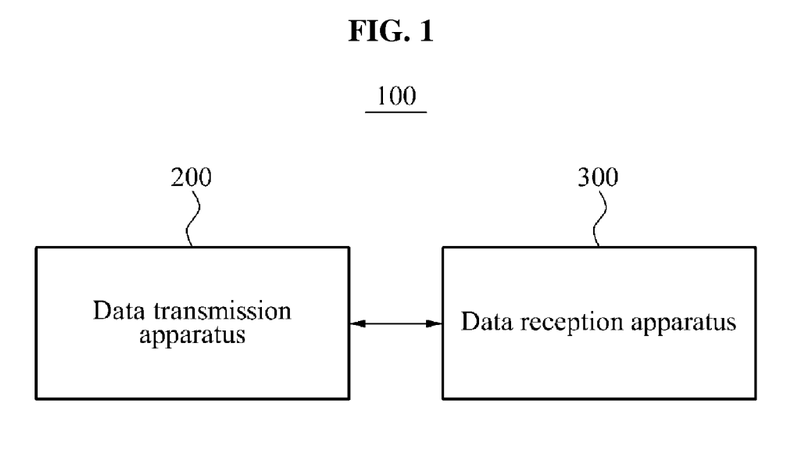
FIG. 1 is a block diagram illustrating an example of a data transmission system.

FIG. 1 is a block diagram illustrating an example of a data transmission system 100.

Referring to FIG. 1, the data transmission system 100 includes a data transmission apparatus 200 and a data reception apparatus 300.

The data transmission apparatus 200 and the data reception apparatus 300 may be implemented using a personal computer (PC), a data server, or a portable electronic device.

The portable electronic device may include, but is not limited to, a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or a portable navigation device (PND), a handheld game console, or an electronic book (e-book).

The data transmission apparatus 200 and the data reception apparatus 300 communicate with one another. For example, the data transmission apparatus 200 and the data reception apparatus 300 mutually transmit and receive a signal or data.

The data transmission apparatus 200 encodes data packets through, for example, erasure coding and generate encoded data packets.

The data transmission apparatus 200 generates authentication packets for data packets using hash images related to the encoded data packets. For example, the data transmission apparatus 200 generates the authentication packets until the hash images related to the encoded data packets are incorporated into a single signature packet. In accordance with an alternative example, the data transmission apparatus 200 generates the authentication packets until the hash images related to the encoded data packets are incorporated into at least one signature packet. For example, the authentication packets are encoded packets.

The data transmission apparatus 200 transmits generated packets to the data reception apparatus 300. For example, the data transmission apparatus 200 transmits the encoded data packets and the authentication packets to the data reception apparatus 300.

The data reception apparatus 300 receives packets transmitted from the data transmission apparatus 200. For example, the data reception apparatus 300 receives the encoded data packets and the authentication packets transmitted from the data transmission apparatus 200.

The data reception apparatus 300 receives the authentication packets transmitted from an external device, for example, the data transmission apparatus 200, and verifies a digital signature of a single signature packet or, in the alternative, at least one signature packet included in the authentication packets.

The data reception apparatus 300 decodes the single signature packet or, in the alternative, the at least one verified signature packet, and verifies the data packets transmitted from the data transmission apparatus 200 based on hash images included in the at least one decoded signature packet. For example, data packets transmitted from the data transmission apparatus 200 are encoded data packets.

In an example, the data reception apparatus 300 requests the data transmission apparatus 200 to transmit the data packets. For example, the data reception apparatus 300 verifies a digital signature of at least one signature packet included in authentication packets, and then requests the data transmission apparatus 200 to transmit the data packets.

Figure 2:
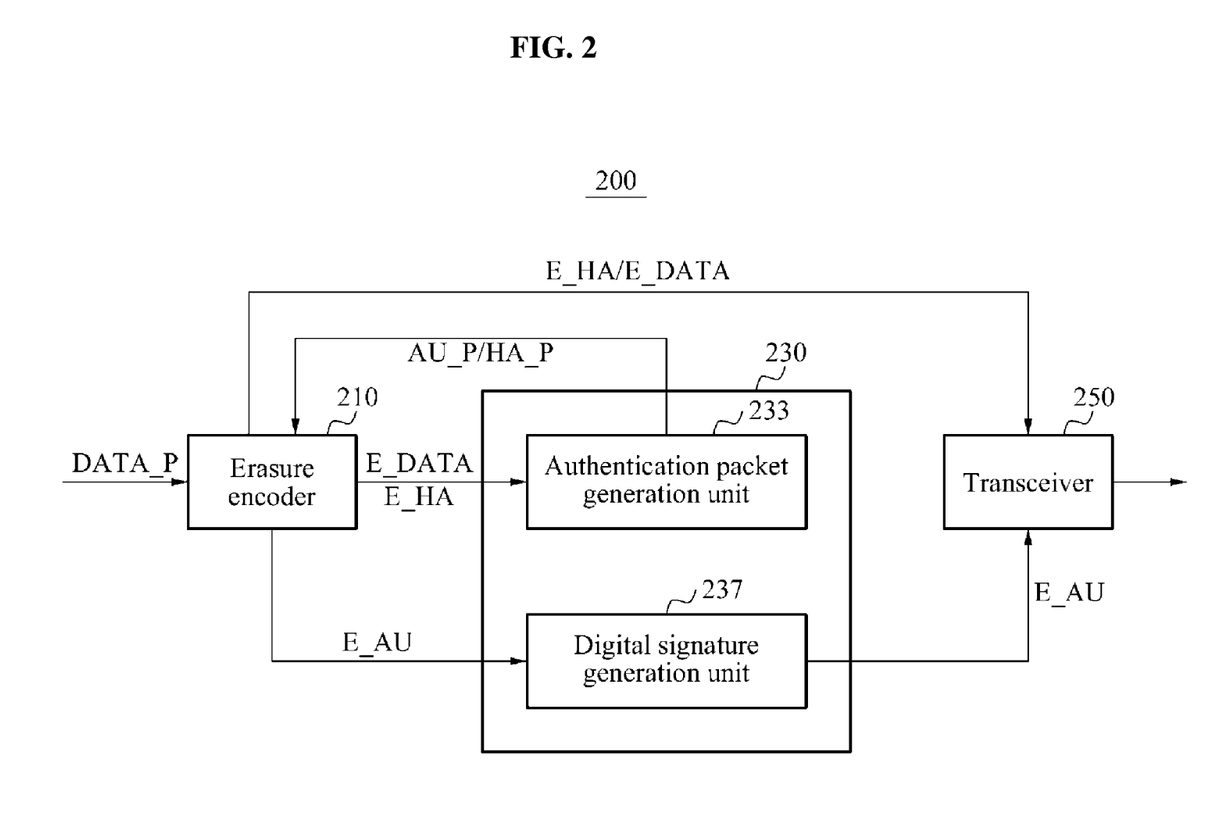
FIG. 2 is a block diagram illustrating an example of a data transmission apparatus of FIG. 1.

FIG. 2 is a block diagram illustrating an example of the data transmission apparatus 200 of FIG. 1.

Referring to FIGS. 1 and 2, the data transmission apparatus 200 includes an erasure encoder 210, an authentication unit 230, and a transceiver 250.

The erasure encoder 210 encodes data packets DATA_P through erasure coding, and generates encoded data packets E_DATA. The erasure encoder 210 transmits the encoded data packets E_DATA to the authentication unit 230.

The erasure encoder 210 encodes authentication packets generated at the authentication unit 230 through the erasure coding. For example, the erasure encoder 210 encodes a signature packet AU_P generated by the authentication unit 230 and generates encoded signature packets E_AU. The erasure encoder 210 encodes hash packets HA_P generated at the authentication unit 230, and generates encoded hash packets E_HA. For example, the authentication packets include at least one of the hash packets HA_P and the signature packet AU_P.

In this example, the erasure encoder 210 generates encoded packets by encoding current packets through the erasure coding based on first parameters. For example, the erasure encoder 210 generates N encoded packets using Equation 1 based on the first parameters.

$$N = \mathrm{ceiling}(M/(1-P)) \quad \text{[Equation 1]}$$

For example, the first parameters include at least one of a number M of current packets and a packet loss rate P. The packet loss rate P is a packet loss rate to provide a resistance through the erasure coding performed by the erasure encoder 210. For example, the packet loss rate P indicates that, although a maximum of P*100% packets encoded by the erasure encoder 210 may be lost during transmission, decoding is possible by using the remaining packets. The packet loss rate P may be programmed and/or set.

The erasure encoder 210 transmits at least one encoded packet, for example, the encoded data packets E_DATA and the encoded hash packets E_HA to the transceiver 250. The erasure encoder 210 transmits the encoded signature packets E_AU to a digital signature authentication unit 237.

The authentication unit 230 generates at least one authentication packet for the data packets DATA_P using hash images related to the encoded data packets E_DATA. For example, the authentication unit 230 generates the at least one authentication packet until the hash images related to the encoded data packets E_DATA are incorporated into a single signature packet AU_P based on second parameters for a transmission of the data packets DATA_P. For example, the second parameters include at least one of a packet loss rate P, a number of current packets, such as current encoded packets, information on a hash function applied to the hash images, and a size of a unit signature packet, such as the signature packet AU_P including the hash images.

The authentication unit 230 includes an authentication packet generation unit 233 and a digital signature generation unit 237.

The authentication packet generation unit 233 computes hash images related to the encoded data packets E_DATA based on the hash function. In an example, the authentication packet generation unit 233 computes hash images of the encoded data packets E_DATA. In another example, the authentication packet generation unit 233 computes hash images of the encoded hash packets E_HA. For example, the hash images include at least one of the hash images of the encoded data packets E_DATA and hash images of packets, for example, the encoded hash packets E_HA related to the encoded data packets E_DATA.

The authentication packet generation unit 233 verifies whether the hash images related to the encoded data packets E_DATA are included in the single signature packet AU_P, and generates at least one of the signature packet AU_P and the hash packets including the hash images based on a result of the verifying.

For instance, the authentication packet generation unit 233 verifies whether the hash images of the encoded data packets E_DATA are included in the single signature packet AU_P, and generates at least one of the single signature packet AU_P and the hash packets HA_P including the hash images based on a result of the verifying. In an example, when the result of the verifying indicates that the hash images are included in the single signature packet AU_P, the authentication packet generation unit 233 generates the signature packet AU_P including the hash images. In another example, when the result of the verifying indicates that the hash images are not included in the single signature packet AU_P, the authentication packet generation unit 233 generates the hash packets HA_P including the hash images. Also, the authentication packet generation unit 233 verifies whether the hash images of the encoded hash packets E_HA are included in the single signature packet AU_P, and generates at least one of the single signature packet AU_P and the hash packets HA_P including the hash images of the encoded hash packets E_HA based on a result of the verifying.

In this example, the authentication packet generation unit 233 verifies whether the hash images related to the encoded data packets E_DATA are included in the single signature packet AU_P using Equation 2, based on the second parameters.

$$|AU\_P| \geq N|\mathrm{hash}| \quad \text{[Equation 2]}$$

As an example, when a size, for example, N|hash| of the hash images related to the encoded data packets E_DATA is less than or equal to a size, for example, |AU_P| of the single signature packet AU_P, the authentication packet generation unit 233 generates the single signature packet AU_P including the hash images related to the encoded data packets E_DATA.

In Equation 2, |AU_P| indicates a size of a unit signature packet, for example, the signature packet AU_P. N denotes a number of current encoded packets. For example, N, the number of current encoded packets may be equal to a number of current hash images generated at the authentication packet generation unit 233. |hash| indicates a size of a hash image. For example, when the authentication packet generation unit 233 computes hash images using an identical hash function, a size, for example, |hash| of each of the hash images generated by the authentication packet generation unit 233 is identical.

When a size, for example N|h( )| of the hash images related to the encoded data packets E_DATA is greater than a size, for example, |AU_P| of the single signature packet AU_P, the authentication packet generation unit 233 generates K hash packets HA_P including the hash images related to the encoded data packets E_DATA using Equation 3 based on the second parameters.

$$K = \mathrm{ceiling}(N|h(\ )|/|AU\_P|) \quad \text{[Equation 3]}$$

In an example, a size, for example, |AU_P| of the signature packet AU_P is equal to a size of a hash packet, for example, a size of a data packet.

For example, the authentication packet generation unit 233 generates authentication packets. The authentication packets include, for example, the signature packet AU_P and/or the hash packets HA_P. The authentication packet generation unit 233 generates the authentication packets until the hash images related to the encoded data packets E_DATA are included in the single signature packet AU_P, based on the second parameters for transmission of the data packets DATA_P.

The digital signature generation unit 237 receives the encoded signature packets E_AU from the erasure encoder 210, and generates a digital signature for each of the encoded signature packets E_AU. The digital signature generation unit 237 transmits the encoded signature packets E_AU including the digital signature to the transceiver 250.

The transceiver 250 transmits generated packets to the data reception apparatus 300. For example, the transceiver 250 transmits, to the data reception apparatus 300, at least one of the encoded signature packets E_AU including the digital signature, the encoded hash packets E_HA, and the encoded data packets E_DATA.

The data transmission apparatus 200 generates separate packets, for example, the hash packets HA_P including the hash images of the encoded data packets E_DATA, to verify integrity of the encoded data packets E_DATA.

In addition, the data transmission apparatus 200 encodes the hash packets HA_P through the erasure coding, and generates the encoded hash packets E_HA having a resistance to a loss occurring in a process of data transmission.

Also, the data transmission apparatus 200 generates the digital signature for the encoded signature packets E_AU. In an illustrative configuration, the data transmission apparatus 200 generates the digital signature exclusively for the encoded signature packets E_AU.

Figure 3:
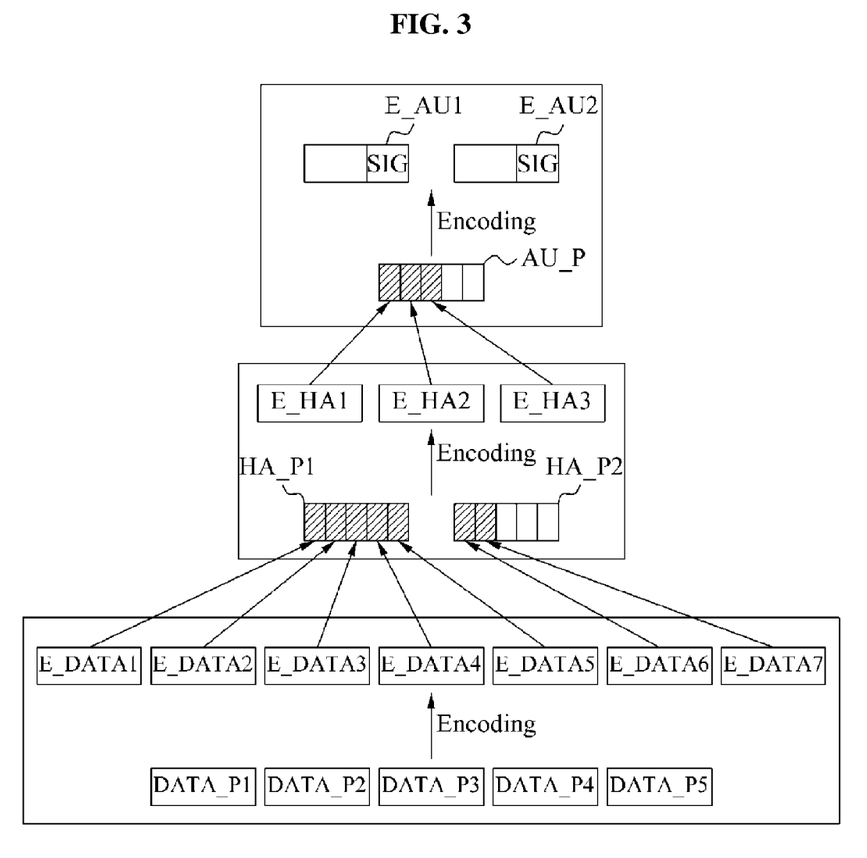
FIG. 3 is a diagram illustrating an example of authenticating data packet transmission of the data transmission apparatus of FIG. 1.

FIG. 3 is a diagram illustrating an example of authenticating data packet transmission of the data transmission apparatus 200 of FIG. 1.

In FIG. 3, for clarity and conciseness, as an illustrative example, a number of data packets DATA_P to be transmitted is "5", a data loss rate P is "0.2", and |AU_P|=5|hash| to describe an authenticating data packet transmission performed at the data transmission apparatus 200.

Referring to FIG. 3, the erasure encoder 210 encodes five data packets DATA_P1 to DATA_P5, and generates seven encoded data packets E_DATA1 to E_DATA7. The erasure encoder 210 transmits the encoded data packets E_DATA1 to E_DATA7 to the authentication packet generation unit 233.

The authentication packet generation unit 233 may generate hash images of the encoded data packets E_DATA1 to E_DATA7 using a hash function. For example a number of the hash images of the encoded data packets E_DATA1 to E_DATA7 may be "7". Because the seven hash images are not included in a single signature packet AU_P, the authentication packet generation unit 233 generates hash packets HA_P1 and HA_P2 including the seven hash images. For example, the authentication packet generation unit 233 generates two hash packets HA_P1 and HA_P2 by separating the seven hash images, and transmits the hash packets HA_P1 and HA_P2 to the erasure encoder 210.

The erasure encoder 210 encodes the two hash packets HA_P1 and HA_P2 through erasure coding, and generates three encoded hash packets E_HA1 to E_HA3. The erasure encoder 210 transmits the encoded hash packets E_HA1 to E_HA3 to the authentication packet generation unit 233. By encoding the hash packets HA_P1 and HA_P2 including the hash images through the erasure coding, the hash packets HA_P1 and HA_P2 have lower losses.

The authentication packet generation unit 233 generates hash images of the encoded hash packets E_HA1 to E_HA3 based on a hash function. For example, a number of the hash images of the encoded data packets E_DATA is "3". The authentication packet generation unit 233 generates the single signature packet AU_P including the three hash images because the three hash images are included in the single signature packet AU_P. For example, the authentication packet generation unit 233 transmits the single signature packet AU_P including the three hash images to the erasure encoder 210.

The erasure encoder 210 encodes the single signature packet AU_P through erasure coding, and generate two encoded signature packets E_AU1 and E_AU2. The erasure encoder 210 transmits the encoded signature packets E_AU1 and E_AU2 to the digital signature generation unit 237.

The digital signature generation unit 237 generates a digital signature SIG for each of the encoded signature packets E_AU1 and E_AU2. In this example, among data storing areas of the encoded signature packets E_AU1 and E_AU2, the digital signature SIG may be included in an area in which two hash images are present. All generated packets are reliably provided because the digital signature generation unit 237 generates the digital signature SIG only for the encoded signature packets E_AU1 and E_AU2 at a highest level.

Figure 4:
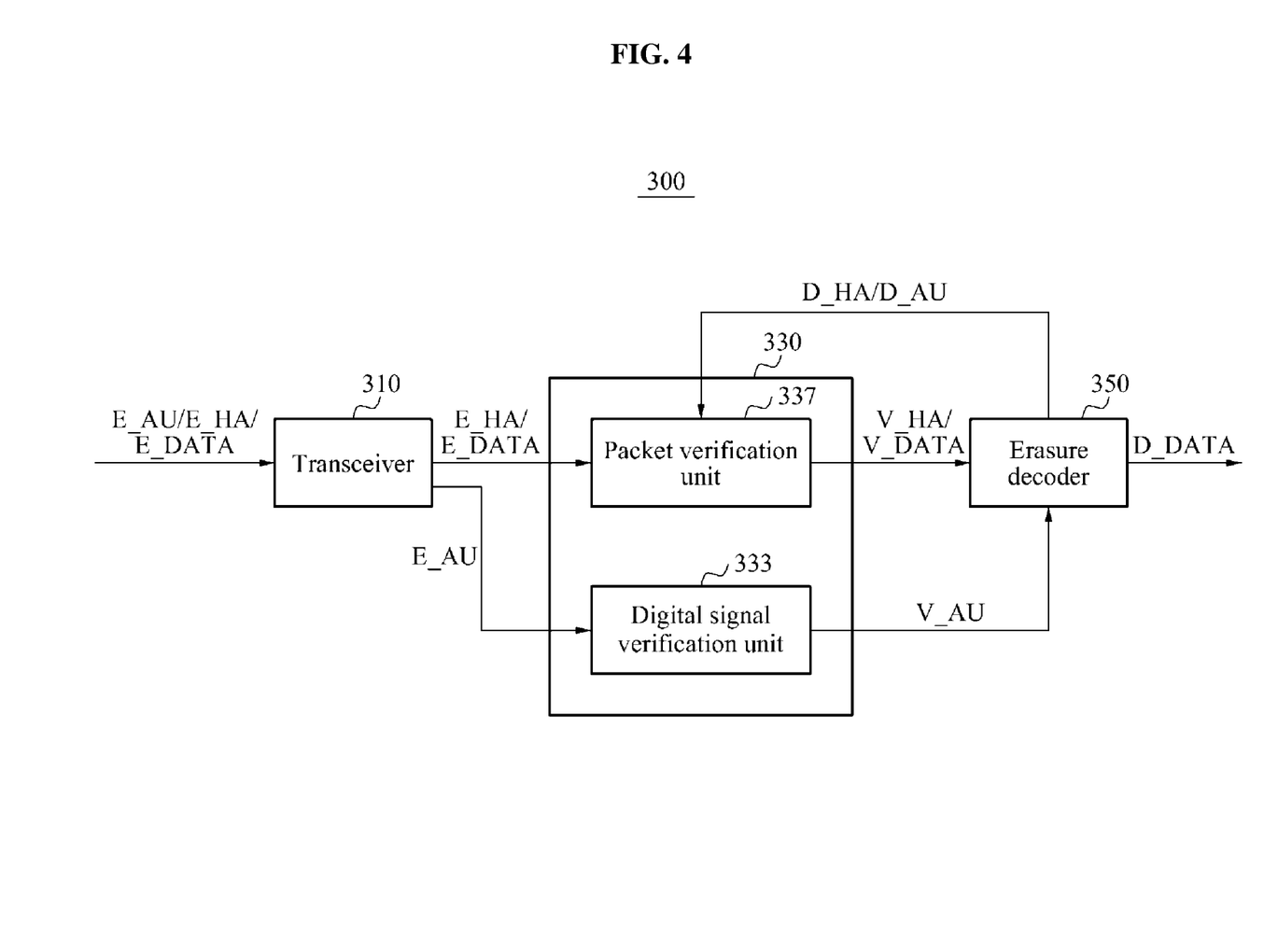
FIG. 4 is a diagram illustrating an example of a data reception apparatus of FIG. 1.

FIG. 4 is a diagram illustrating an example of the data reception apparatus 300 of FIG. 1.

Referring to FIGS. 1 and 4, the data reception apparatus 300 includes a transceiver 310, a verification unit 330, and an erasure decoder 350.

The transceiver 310 receives authentication packets and data packets transmitted from the data transmission apparatus 200. For example, the transceiver 310 receives encoded authentication packets and encoded data packets E_DATA transmitted from the data transmission apparatus 200. For example, the authentication packets include at least one of encoded signature packets E_AU and encoded hash packets E_HA. For example, each of the encoded signature packets E_AU includes a digital signature.

The transceiver 310 transmits the encoded signature packets E_AU to a digital signature verification unit 333, and transmits the encoded hash packets E_HA and the encoded data packets E_DATA to a packet verification unit 337.

The verification unit 330 verifies the packets transmitted from the transceiver 310. For example, the verification unit 330 verifies at least one of the encoded data packets E_DATA, the encoded hash packets E_HA, and the encoded signature packets E_AU.

The verification unit 330 includes the digital signature verification unit 333 and the packet verification unit 337.

The digital signature verification unit 333 verifies the digital signature of at least one encoded signature packet among the encoded signature packets E_AU, and transmits at least one verified signature packet V_AU to the erasure decoder 350. By verifying the digital signature of the at least one encoded signature packet, the digital signature verification unit 333 reduces overhead occurring in an overall process of verifying the digital signature.

The packet verification unit 337 verifies the encoded data packets E_DATA based on hash images included in at least one decoded signature packet D_AU. For example, the packet verification unit 337 verifies the encoded hash packets E_HA based on hash images included in the at least one decoded signature packet D_AU. The packet verification unit 337 verifies the encoded data packets E_DATA based on hash images included in decoded hash packets D_HA decoded by the erasure decoder 350.

The packet verification unit 337 transmits verified hash packets V_HA and verified data packets V_DATA to the erasure decoder 350.

The erasure decoder 350 decodes packets verified by the verification unit 330. For example, the erasure decoder 350 decodes the at least one verified signature packet V_AU verified at the digital signature verification unit 333, and generates the decoded hash packets D_HA. Also, the erasure decoder 350 decodes verified data packets V_DATA verified by the packet verification unit 337 and generates decoded data packets D_DATA. In one example, the decoded data packets D_DATA is identical to the data packets DATA_P transmitted from the data transmission apparatus 200.

By verifying the digital signature of the at least one encoded signature packet E_AU only, the data reception apparatus 300 reduces overhead occurring in an overall process of verifying the digital signature.

Figure 5:
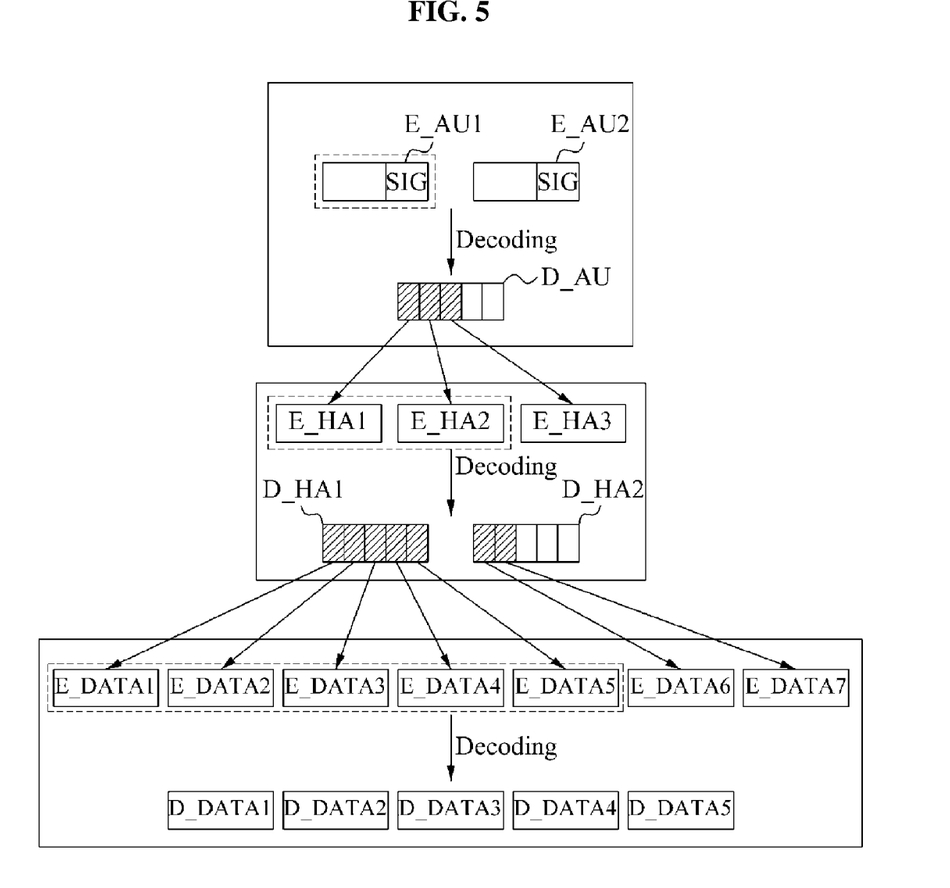
FIG. 5 is a diagram illustrating an example of verifying data packet transmission of the data reception apparatus of FIG. 1.

FIG. 5 is a diagram illustrating an example of verifying data packet transmission of the data reception apparatus 300 of FIG. 1.

For increased clarity and conciseness, descriptions about an operation in which the data reception apparatus 300 verifies packets generated based on the aforementioned method of FIG. 3 will be provided with reference to FIG. 5.

Referring to FIG. 5, the digital signature verification unit 333 verifies at least one encoded signature packet E_AU1 based on a digital signature SIG included in the at least one encoded signature packet E_AU1. In this example, the erasure decoder 350 generates a single decoded signature packet D_AU based on a single encoded signature packet E_AU1 verified based on encoded signature packets E_AU1 and E_AU2. For example, the decoded signature packet D_AU includes three hash images. By verifying the digital signature SIG of the at least one encoded signature packet E_AU1, the digital signature verification unit 333 reduces an amount of overhead verification.

The packet verification unit 337 verifies three encoded hash packets E_HA1 to E_HA3 based on the three hash images included in the decoded signature packet D_AU. In this example, the erasure decoder 350 generates two decoded hash packets D_HA1 and D_HA2 based on two encoded hash packets verified from among the encoded hash packets E_HA1 to E_HA3. In one example, the decoded hash packets D_HA1 and D_HA2 includes seven hash images.

The packet verification unit 337 verifies seven encoded data packets E_DATA1 to E_DATA7 based on the seven hash images included in the decoded hash packets D_HA1 and D_HA2. In this example, the erasure decoder 350 generates decoded data packets D_DATA1 to D_DATA5 based on five data packets E_DATA1 to E_DATA5 verified from among the encoded data packets E_DATA1 to E_DATA7.

Figure 6:
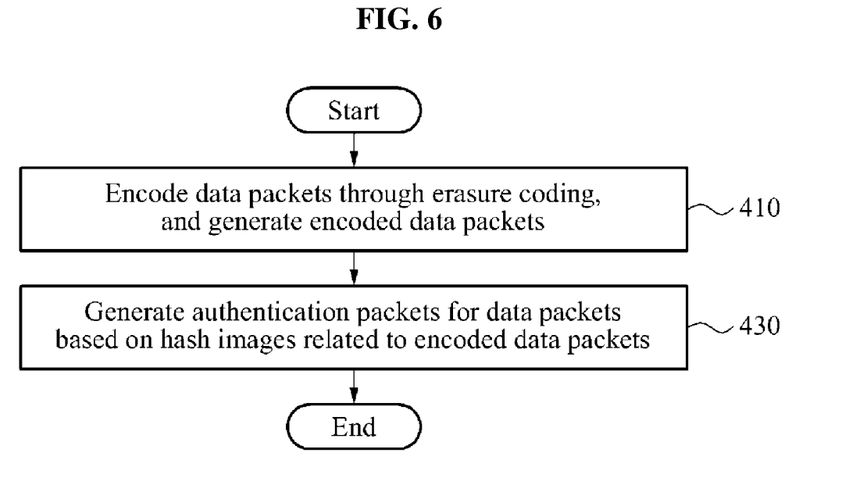
FIG. 6 is a flowchart illustrating an example of an operating method of the data transmission apparatus of FIG. 1.

FIG. 6 is a flowchart illustrating an example of an operating method of the data transmission apparatus 200 of FIG. 1.

Referring to FIG. 6, at operation 410, the operating method encodes, at the data transmission apparatus 200, data packets through erasure coding, and generates encoded data packets.

At operation 430, the operating method, at the data transmission apparatus 200, generates authentication packets for data packets based on hash images related to the encoded data packets.

Figure 7:
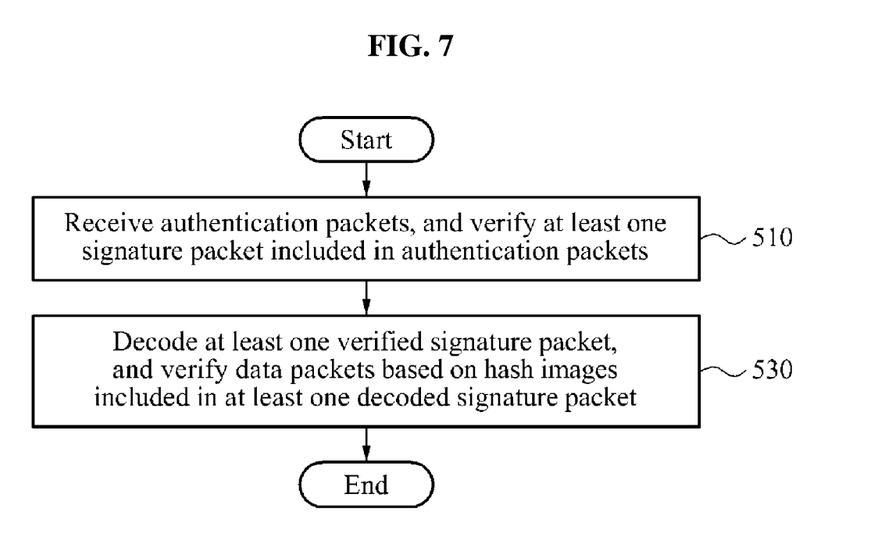
FIG. 7 is a flowchart illustrating an example of an operating method of the data reception apparatus of FIG. 1.

FIG. 7 is a flowchart illustrating an example of an operating method of the data reception apparatus 300 of FIG. 1.

Referring to FIG. 7, at operation 510, the operating method, at the data reception apparatus 300, receives authentication packets transmitted from an external device, for example, the data transmission apparatus 200, and verifies a digital signature of at least one signature packet included in the authentication packets.

At operation 530, the operating method, at the data reception apparatus 300, decodes the at least one verified signature packet, and verifies data packets, for example, the encoded data packets transmitted from the data transmission apparatus 200 based on hash images included in the at least one decoded signature packet.

Figure 8:
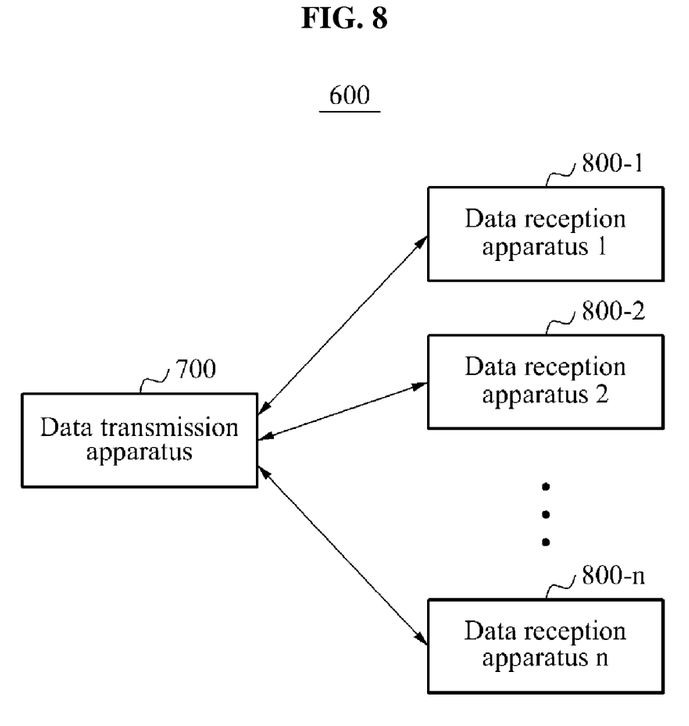
FIG. 8 is a block diagram illustrating another example of a data transmission system.

FIG. 8 is a block diagram illustrating another example of a data transmission system 600.

Referring to FIG. 8, the data transmission system 600 includes a data transmission apparatus 700 and a plurality of data reception apparatuses, for example, a data reception apparatus 800-1 to a data reception apparatus 800-n, n being a natural number greater than "1".

The data transmission apparatus 700 and the plurality of data reception apparatuses may be implemented by a PC, a data server, or a portable electronic device.

The portable electronic device may be implemented through a laptop computer, a mobile phone, a smartphone, a tablet PC, an MID, a PDA, an EDA, a digital still camera, a digital video camera, a PMP, a PND, a handheld game console, or an e-book.

The data transmission apparatus 700 and each of the plurality of data reception apparatuses may communicate with one another. For example, the data transmission apparatus 700 and each of the plurality of data reception apparatuses may mutually transmit and receive a signal or data in a broadcast or multicast environment. Also, the data transmission apparatus 700 and the plurality of data reception apparatuses may transmit and receive a signal or data in a data environment for small wireless devices, for example, a Zigbee with low power consumption.

In practice, operations and configurations of the data transmission apparatus 700 and the plurality of data reception apparatuses of FIG. 8 may be identical to operations and configurations of the data transmission apparatus 200 and the data reception apparatus 300 and; thus; repeated descriptions will be omitted for conciseness and ease of description.

The units and apparatuses described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

It is to be understood that in the embodiment of the present invention, the operations in FIGS. 6 and 7 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the methods described in FIGS. 6 and 7.

Program instructions to perform a method described in FIGS. 6 and 7, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An authentication method of data packets transmitted from a data transmission apparatus to a data reception apparatus, the method comprising:
   encoding the data packets through erasure coding;
   generating hash images of the encoded data packets;
   verifying whether the hash images are included in a single signature packet;
   generating at least one of hash packets included in the hash images and the single signature packet based on a result of the verifying; and
   transmitting the encoded data packets and authentication packets comprising at least one of hash packets and the single signature packet to the data reception apparatus.

2. The authentication method of claim 1, wherein the generating comprises generating, based on parameters for transmission of the data packets, the authentication packets until the hash images related to the encoded data packets are incorporated into a single signature packet.

3. The authentication method of claim 1, wherein in response to the verifying that the hash images of the encoded data packets are included in the single signature packet, the verifying comprises encoding the single signature packet through the erasure coding and generating the encoded signature packets to be the signature packets.

4. The authentication method of claim 1, wherein in response to the verifying indicating that the hash images are excluded from the single signature packet, the verifying comprises
   generating hash packets including the hash images of the encoded data packets,
   encoding the hash packets through the erasure coding,
   generating the encoded hash packets included in the authentication packets, and
   verifying whether the hash images of the encoded hash packets are included in the single signature packet and generating the signature packets based on a result of the verifying.

5. The authentication method of claim 2, wherein the parameters comprise at least one of a packet loss rate, a current number of packets, information of a hash function applied to the hash images, and information on a size of a unit signature packet comprising the hash images.

6. The authentication method of claim 1, wherein the hash images related to the encoded data packets comprise at least one of hash images of the encoded data packets and hash images of packets of the encoded data packets.

7. The authentication method of claim 1, wherein a size of the single signature packet is identical to a size of a data packet.

8. A data transmission apparatus to transmit data packets to a data reception apparatus by authenticating the data packets, comprising:
   a memory storing instructions;
   a processor configured to execute the instructions such that the processor is configured to,
      encode data packets through erasure coding,
      generate hash images of the encoded data packets,
      verify whether the hash images are included in a single signature packet, and
      generate at least one of hash packets included in the hash images and the single signature packet based on a result of the verifying;
   a transceiver configured to transmit the encoded data packets and authentication packets comprising at least one of hash packets and the single signature packet to the data reception apparatus.

9. The data transmission apparatus of claim 8, wherein the processor is further configured to
   generate a digital signature for each of the encoded signature packets based on the single signature packet.

10. The data transmission apparatus of claim 8, wherein the processor is configured to generate the authentication packet until the hash images related to the encoded data packets are incorporated into a single signature packet based on parameters to transmit the data packets.

11. The data transmission apparatus of claim 8, wherein the processor is configured to generate the single signature packet in response to the hash images related to the encoded data packets being included in the single signature packet.

12. The data transmission apparatus of claim 8, wherein the hash images related to the encoded data packets comprise at least one of hash images of the encoded data packets and hash images of packets related to the encoded data packets.

13. The data transmission apparatus of claim 10, wherein the parameters comprise at least one of a packet loss rate, a number of current packets, information of a hash function applied to the hash images, and information on a size of a unit signature packet comprising the hash images.

14. The data transmission apparatus of claim 8, wherein a size of the single signature packet is identical to a size of a data packet.

* * * * *